Aug. 29, 1939.  W. F. FROCK  2,171,144
SELECTIVE GEAR TRANSMISSION
Filed March 9, 1938  2 Sheets-Sheet 1
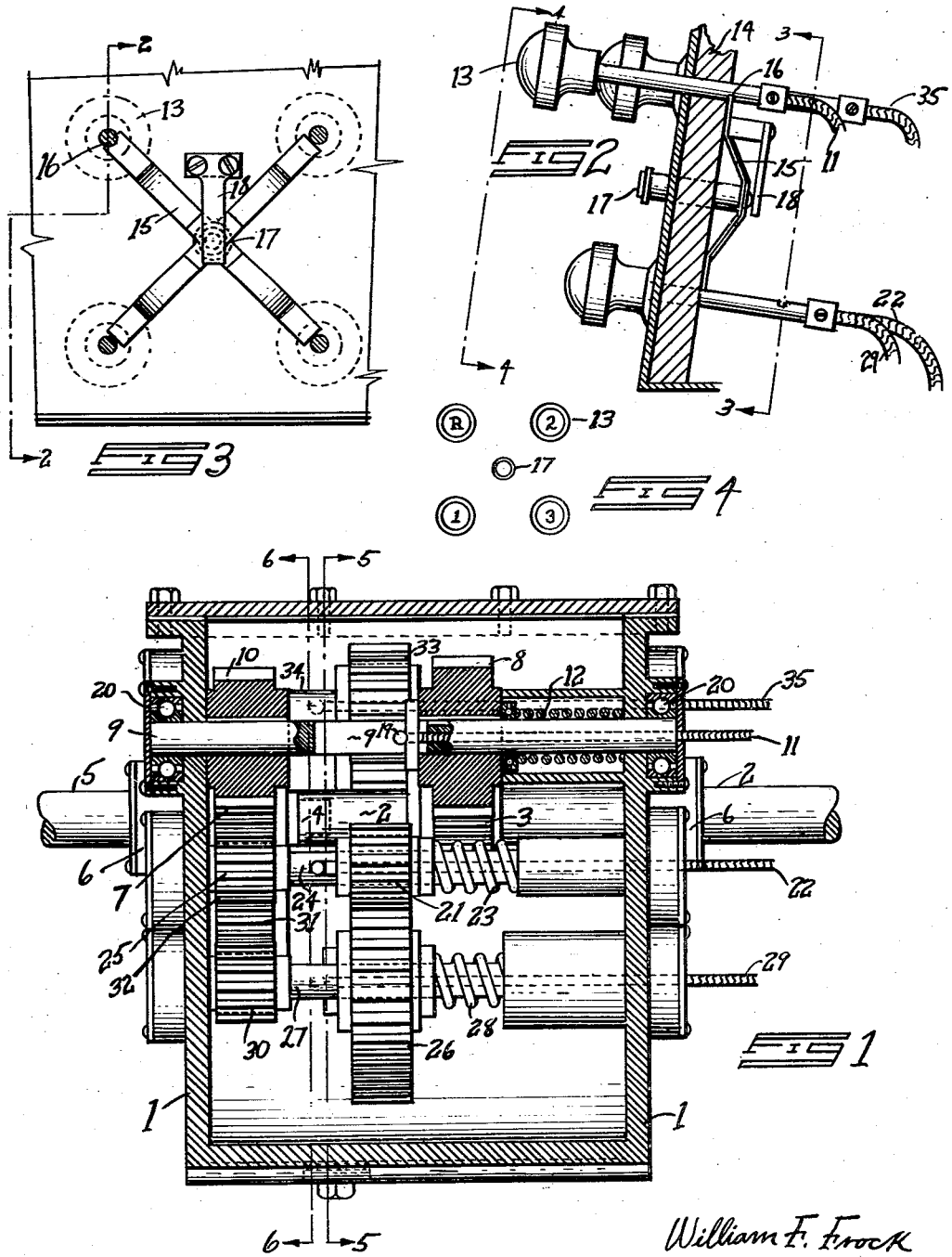
William F. Frock
INVENTOR
BY W. B. Harpman
ATTORNEY

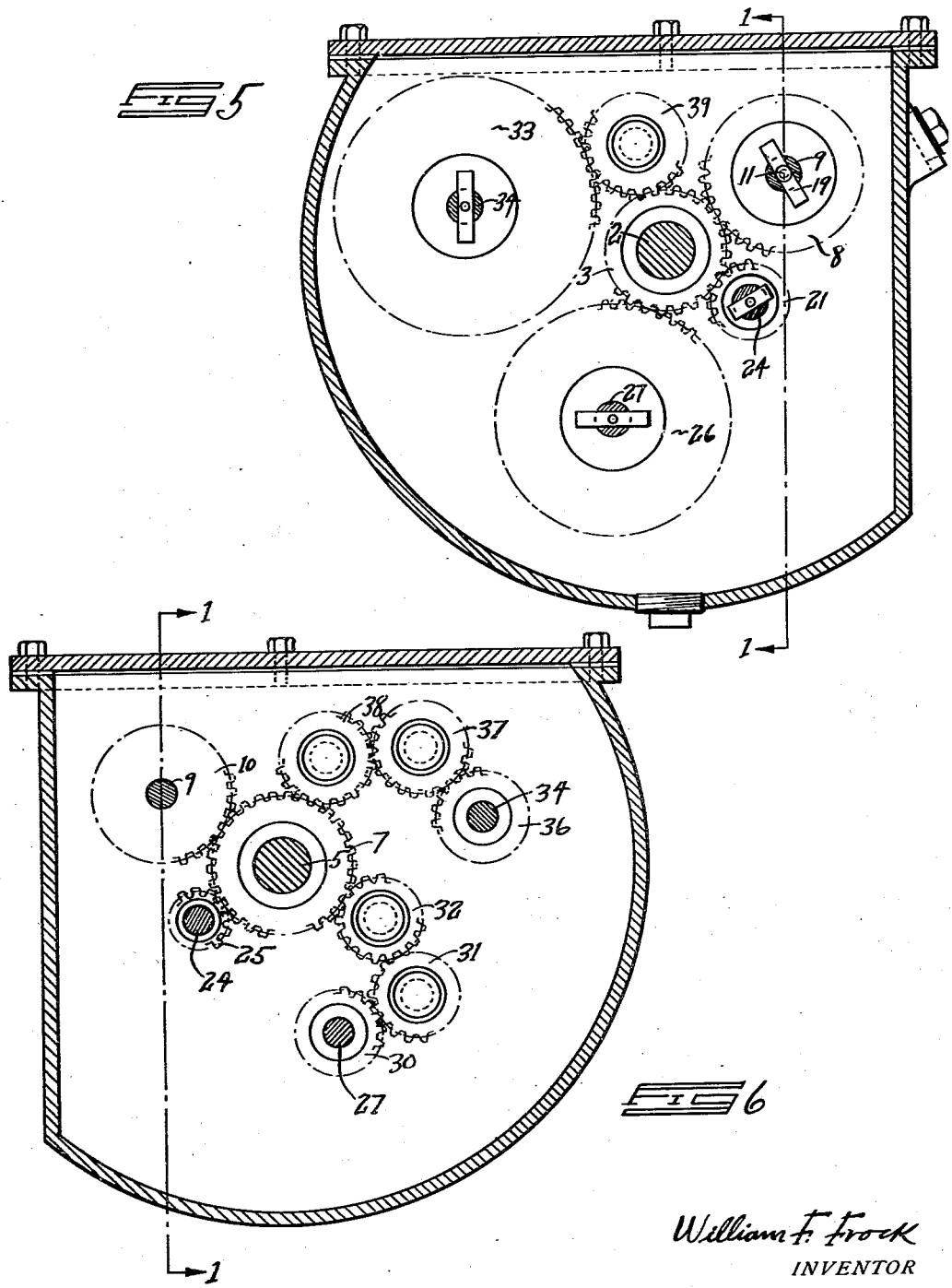

Patented Aug. 29, 1939

2,171,144

UNITED STATES PATENT OFFICE 2,171,144

SELECTIVE GEAR TRANSMISSION

William F. Frock, North Jackson, Ohio

Application March 9, 1938, Serial No. 194,773

3 Claims. (Cl. 74—342)

This invention relates to a power transmission and more particularly to a selective gear transmission designed for operation by remote control.

The principal object of this invention is the provision of a selective gear transmission so designed that the various gear ratios are selected by slideably engaging gears by means of flexible cables connecting the transmission to a remote control unit.

A further object of this invention is the provision of a transmission adapted for use in motor vehicles and provided with a remotely situated control unit which incorporates means for releasing any pre-selected gear and automatically placing the transmission in neutral.

The selective gear transmission shown and described herein has been designed to provide a transmission readily adaptable to positive remote control through the use of flexible cables or other similar means.

The selective gears have been slideably positioned upon shafts in the transmission in such manner that in order to engage them it is necessary to compress a spring which will in turn disengage the slideable gear when the release button on the remotely situated control unit is moved. The transmission has been designed to be used in motor vehicles and will function satisfactorily in connection with either the usual clutch mechanism or any automatic or semi-automatic clutch mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a side elevation of the transmission with parts in cross section.

Figure 2 is a side elevation of the remote control means with parts in cross section and has dotted lines connecting the various portions thereof with their component parts in Figure 1.

Figure 3 is a cross section taken on lines 3—3 of Figure 2 and shows a rear elevation of the control means. This figure has cross section lines 2—2 to indicate the cross sections shown in Figure 2.

Figure 4 is a schematic view of the positions of the control buttons shown in Figure 2 as indicated by lines 4—4 on Figure 2.

Figure 5 is a cross section taken on lines 5—5 of Figure 1 and cross section lines 1—1 on this view indicate the cross section in Figure 1.

Figure 6 is a cross section taken on lines 6—6 of Figure 1 and cross section lines 1—1 on this view indicate the cross section in Figure 1.

By referring to the drawings and Figures 1 and 2 in particular it will be seen that the transmission comprises a housing 1 having a plurality of shafts positioned crosswise therein. The principal shaft 2 is adapted to be connected to a clutch assembly and has a main driving gear 3 keyed thereon at a point well within the housing 1. The inner end of this shaft 2 is adapted to receive the stub end 4 of a drive shaft 5. The shaft 2 and the drive shaft 5 are provided with ball bearings positioned in housings 6 at either side of the housing 1, which in connection with the stub end 4 of the drive shaft 5 supporting and being supported within the inner end of the shaft 2 provide means for suitably carrying these shafts.

Positioned at fixed locations adjacent to the said shafts 2 and 5 there are a plurality of secondary shafts each of which carries a gear keyed thereto, and geared directly or indirectly to a main driven gear 7 which is in turn keyed to the drive shaft 5 (see Figure 6).

In Figures 1 and 2 the transmission has been shown with a second or intermediate gear 8 in driving position and in this position the intermediate gear 8 is meshed with the main driving gear 3. Thus the motion of the shaft 2 is transmitted through this driving gear 3 and the intermediate gear 8 to a shaft 9 upon which this intermediate gear 8 is splined. As there is an intermediate driven gear 10 keyed to this shaft 9 which is in turn in mesh with the main driven gear 7, the motion is thus conveyed through these gears to the drive shaft 5. It will be seen that the intermediate gear 8 has been moved into mesh with the main driving gear 3 by means of a pulling motion exerted upon a flexible cable 11. A coil spring 12 having been compressed by this action will automatically move the intermediate gear 8 back to a neutral position as soon as the pulling motion being exerted by the flexible cable 11 is released. By referring to Figures 2 and 3 it will be seen that the opposite end of this flexible cable 11 is connected to a remote control button 13 which has been positioned in a slideable manner in a section of the dash 14. In order that the button 13 will remain in an extended position as shown, a spring catch mechanism 15 has been provided which functions in a notch 16 in the stem of the button 13. In order that this spring tension mechanism may be released a push button 17 has been provided and when moved will force backwardly a spring 18 thus withdrawing the engaged portion of the spring mechanism 15 from the notch 16. It is obvious that when this occurs the coil spring 12 positioned within the transmission will immediately force the intermediate gear 8 out of mesh, it being understood that suitable clutching action has taken place simultaneously.

It will be seen that the flexible cable 11 is connected to a pin 19 which serves as the means of exerting the pulling motion upon the gear 8. It will also be seen that the shaft 9 is supported within the housing 1 by means of ball bearings 20.

It will be seen that each of the other selective gears, namely first, high, and reverse are provided for in substantially the same manner as the structure set forth in detail concerning the second or intermediate gear. In the drawings these other gears are shown in neutral position, the first gear being designated by numeral 21. This gear 21 is the splined drive gear and is adapted to mesh with the main driving gear 3. When placed in use by pulling motion exerted upon a flexible cable 22, it will compress a coil spring 23, mesh with the driving gear 3 and place in motion the splined shaft 24 which is also in mesh with the main driving gear 7. The motion carried through this particular set of gears is conveyed to the drive shaft 5. The remote control unit attached to the opposite end of the cable 22 is exactly the same as that attached to the control cable 11, above mentioned. The other two selective gears, namely high and reverse comprise structure substantially the same as that already described with the exception that in each instance a pair of idler gears (see Fig. 6) have been positioned between the keyed driven gears and the main driven gear 7.

The high gear assembly comprises a splined drive gear 26 positioned upon a shaft 27 and maintained in neutral position by means of a compressible coil spring 28.

A flexible cable 29 being provided for exerting a pulling motion upon the drive gear 26 to compress the coil spring 28 and cause the drive gear 26 to mesh with the main driving gear 3. When this has occurred, the movement is transmitted through the shaft 27 and causes a driven gear 30 to exert motion through a pair of idler gears 31 and 32 to the main driven gear 7 keyed upon the drive shaft 5.

The reverse gear assembly comprises a splined drive gear 33 positioned upon a shaft 34 and held in neutral position in exactly the same manner as the other gears and adapted to be placed in operation in the same way as the other gears, except that in this instance the gear 33 engages the main driving gear 3 through an idler gear 39 to reverse the motion, when moved into mesh by motion exerted through a flexible cable 35. Keyed to the shaft 34 there is a driven gear 36 which will exert motion through a pair of idler gears 37 and 38 to the main driven gear 7 which is keyed upon the drive shaft 5.

Thus it will be seen that the transmission comprises a plurality of shafts having driven gears keyed thereon and adapted to transmit motion to the drive shaft 5 by meshing with a main driven gear 7, and that the motion is imparted to the various shafts and driven gears through drive gears slideably mounted on splines in the shafts by meshing the drive gears with the main driving gear 3. The various gears are brought into mesh with the main driving gear 3 by being moved upon the shafts by means of a pulling motion exerted through flexible cables connecting the transmission unit to a remote control unit. The gear being used remains in mesh with the main driving gear 3 as long as its component control button is in an extended position, and upon the movement of a push button 17 a spring catch mechanism 15 will disengage from a notch in the said control buttons stem thus permitting a coil spring to slide the individual gear being used back to a neutral position.

What I claim is:

1. In a selective gear transmission for motor vehicles comprising a housing, a principal shaft positioned therein and adapted to be connected to a clutch assembly at the outer end thereof, the inner end thereof adapted to receive a stub end of a drive shaft also positioned in the housing, a plurality of secondary shafts positioned at fixed locations adjacent thereto, a slideable drive gear positioned on each of the said plurality of secondary shafts and a driven gear keyed to each of the said plurality of secondary shafts, a main drive gear keyed to the said principal shaft and a main driven gear keyed to the said drive shaft, each of the said slideably positioned drive gears adapted to be meshed with the said main drive gear, each of the said driven gears being continually meshed with the said driven gear directly, or indirectly through idler gears, together with coil springs positioned on each of the said plurality of secondary shafts and adapted to hold the said splined drive gears in a neutral position, flexible cables attached to each of the said plurality of drive gears and adapted to move the said drive gears into mesh with the said main drive gear.

2. In a selective gear transmission for motor vehicles comprising a housing, a principal shaft positioned therein and adapted to be connected to a clutch assembly at the outer end thereof, the inner end thereof adapted to receive a stub end of a drive shaft also positioned in the housing, a plurality of secondary shafts positioned at fixed locations adjacent thereto, a slideable drive gear positioned on each of the said plurality of secondary shafts and a driven gear keyed to each of the said plurality of secondary shafts, a main drive gear keyed to the drive shaft, each of the said slideably positioned drive gears adapted to be meshed with the said main drive gear, each of the said driven gears being continually meshed with the said driven gear directly, or indirectly through idler gears, coil springs positioned on each of the said plurality of secondary shafts and adapted to hold the said splined drive gears in a neutral position, flexible cables attached to each of the said plurality of drive gears and adapted to move the said drive gears into mesh with the said main drive gear, together with a remote control unit comprising a plurality of buttons slideably positioned in a dash board and connected to the said flexible cables, means for holding the buttons in an extended position comprising a spring catch adapted to function in notches in stems of the said buttons, release means for the said buttons comprising a push button adapted to release the said spring catch from the said notches and permit the button to return to a neutral position.

3. A selective gear transmission for motor vehicles comprising an assembly of selective gears positioned within a housing, the said selective gears comprising a plurality of driven gears positioned on shafts and in mesh with a drive shaft gear, means for transmitting motion from a principal shaft to anyone of the said driven gears and their shafts, the said means comprising a plurality of drive gears slideably positioned by means of splines on the last mentioned shafts in such manner that any one of the said drive gears may be moved into mesh with a main drive gear positioned on the principal shaft, together with means for moving the said drive gears in and out of mesh with the said main driving gear comprising a plurality of flexible cables attached one to each of the said splined driving gears and having their opposite ends attached to remotely situated control buttons, a plurality of coil springs positioned one adjacent to each of the said driving gears and adapted to normally hold the said driving gears in neutral position, in such manner that the said coil springs will be compressed when the said driving gears are moved into mesh with the main driving gear.

WILLIAM F. FROCK.